(12) United States Patent
Kutagulla et al.

(10) Patent No.: US 7,184,714 B1
(45) Date of Patent: Feb. 27, 2007

(54) FREQUENCY DOMAIN ESTIMATION OF IQ IMBALANCE IN A WIRELESS OFDM DIRECT CONVERSION RECEIVER USING LOOPBACK CONNECTION

(75) Inventors: Harish Kutagulla, Austin, TX (US); Chien-Meen Hwang, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 588 days.

(21) Appl. No.: 10/699,667

(22) Filed: Nov. 4, 2003

(51) Int. Cl.
*H04B 1/38* (2006.01)

(52) U.S. Cl. .............................. 455/73; 455/85; 455/86; 455/67.16; 375/295; 375/296; 375/297

(58) Field of Classification Search ................ 455/126, 455/129, 73, 85, 86, 67.16; 375/295, 296, 375/297
See application file for complete search history.

(56) References Cited

U.S. PATENT DOCUMENTS

| | | | |
|---|---|---|---|
| 5,732,333 A * | 3/1998 | Cox et al. ..................... | 455/126 |
| 6,934,341 B2 * | 8/2005 | Sahlman ...................... | 375/297 |
| 6,940,916 B1 * | 9/2005 | Warner et al. ............... | 375/261 |
| 2004/0095993 A1 * | 5/2004 | Liu et al. ..................... | 375/219 |
| 2004/0217753 A1 * | 11/2004 | Yamanaka et al. ........ | 324/76.21 |

OTHER PUBLICATIONS

IEEE Std. 802.11a-1999, "Part 11: Wireless LAN Medium Access Control (MAC) and Physical Layer (PHY) specifications: High-speed Physical Layer in the 5 GHZ Band", LAN/MAN Standards Committee of the IEEE COmputer Society, IEEE-SA Standards Board, Approved Sep. 16, 1999, New York, USA.

* cited by examiner

*Primary Examiner*—Matthew Anderson
*Assistant Examiner*—Sanh Phu
(74) *Attorney, Agent, or Firm*—Manelli Denison & Selter PLLC; Leon R. Turkevich

(57) ABSTRACT

An OFDM transceiver has a transmitter, a receiver, and a loopback switch. The loopback switch configured is for selectively establishing a physical connection between an output terminal of the transmitter and an input terminal of the receiver. The transmitter is configured for outputting to the output terminal an OFDM signal generated based on a local oscillator signal. The receiver is configured for demodulating the OFDM signal, received via the physical connection, using the local oscillator signal and determining amplitude and phase imbalance parameters based on performing frequency-domain estimation of amplitude and phase imbalances. Hence, the receiver is configured for performing imbalance compensation on a received wireless OFDM signal based on the determined amplitude and phase imbalance parameters. Hence, amplitude and phase imbalances can be estimated accurately despite channel fading and frequency variations encountered between the transmitter of the wireless OFDM signal and the receiver.

9 Claims, 4 Drawing Sheets

FREQUENCY DOMAIN ESTIMATION OF IQ IMBALANCE IN A WIRELESS OFDM DIRECT CONVERSION RECEIVER USING LOOPBACK CONNECTION

BACKGROUND OF THE INVENTION

1. Field of the Invention

The present invention relates to estimation of amplitude and phase imbalance in wireless direction conversion receivers, for example an IEEE 802.11a based Orthogonal Frequency Division Multiplexing (OFDM) receiver.

2. Background Art

Local area networks historically have used a network cable or other media to link stations on a network. Newer wireless technologies are being developed to utilize OFDM modulation techniques for wireless local area networking applications, including wireless LANs (i.e., wireless infrastructures having fixed access points), mobile ad hoc networks, etc. In particular, the IEEE Standard 802.11a, entitled "Wireless LAN Medium Access Control (MAC) and Physical Layer (PHY) specifications: High-speed Physical Layer in the 5 GHz Band", specifies an OFDM PHY for a wireless LAN with data payload communication capabilities of up to 54 Mbps. The IEEE 802.11a Standard specifies a PHY system that uses fifty-two (52) subcarrier frequencies that are modulated using binary or quadrature phase shift keying (BPSK/QPSK), 16-quadrature amplitude modulation (QAM), or 64-QAM.

Hence, the IEEE Standard 802.11a specifies an OFDM PHY that provides high speed wireless data transmission with multiple techniques for minimizing data errors.

A particular concern in implementing an IEEE 802.11 based OFDM PHY in hardware involves providing a cost-effective, compact device the can be implemented in smaller wireless devices. Hence, implementation concerns typically involve cost, device size, and device complexity.

FIG. 1 is a diagram of a typical direct conversion receiver. The direct conversion receiver 10 includes an antenna 12, a low noise amplifier 14, a local oscillator 16 tuned to a prescribed carrier frequency, mixers 18a and 18b, and lowpass channel filters 20a and 20b. As recognized in the art, I and Q channel signals are generated based on modulating a signal by a first carrier and a second carrier phase-shifted by $\pi/2$ (i.e., 90 degrees), respectively. The received signal is supplied to the mixers 18a and 18b. The mixer 18a outputs a first demodulated signal that includes the I component and a first carrier component (e.g., a sine wave); the mixer 18b, having received a phase-shifted carrier signal from the phase shifter 22, outputs a second demodulated signal that includes the Q component and a second carrier component (e.g., a cosine wave). The low pass filters 20a and 20b remove the respective carrier components and output the I and Q components, respectively.

A particular concern involves IQ imbalances in direct conversion receiver architecture. In particular, the I and Q components in theory should have the same respective amplitude and phase. However, the phase and amplitude of the I and Q components output by the direct conversion receiver 10 are not the same; hence, I/Q imbalance compensation is necessary to avoid deterioration of the signal to noise ratio which may prevent decoding of the received packet.

Amplitude and phase imbalances can be corrected in either in the time domain or the frequency domain in an OFDM system. The effect of the amplitude/phase imbalance is expressed by the following relation quantitatively.

Assuming for the following analysis that there is no frequency offset and channel characteristics have a flat frequency response, Let:

$a_k$ be the Desired Symbol at sub-carrier k in an OFDM signal, and $\hat{a}_k$ be the Received Symbol at carrier k after imbalance (phase $\theta$, amplitude $\alpha$)

Then $$\hat{a}_k = \left(a_k + \frac{\alpha}{2}a_{-k}\right)\cos\left(\frac{\theta}{2}\right) + j\left(\frac{\alpha}{2}a_k - a_{-k}\right)\sin\left(\frac{\theta}{2}\right)$$

Where the "Received symbol" is the combination of the desired symbol and the symbol at the image sub-carrier.

However, the above analysis is only valid and accurate if the frequency offset is minimal between the receiver and the transmitter and the channel charactersitic between them is a flat frequency response. In a real world, the effects of channel and clock offset dominate and the channel estimation algorithm would not be able to distinguish between the effects of imbalance, channel, frequency offsets. Therefore the estimation of phase/amplitude imbalance from a signal received from an another station will yield inaccurate results.

SUMMARY OF THE INVENTION

There is a need for an arrangement that enables a direct conversion receiver to accurately estimate amplitude and phase imbalances in a received signal using frequency-based estimation techniques, despite frequency offset variations between a local oscillator and a source oscillator having transmitted the received signal.

There also is a need for an arrangement that enables a direct conversion receiver, configured for receiving IEEE 802.11a based OFDM wireless signals, to accurately estimate amplitude and phase imbalances of received I and Q components using frequency-based estimation techniques.

There also is a need for an arrangement that enables a direct conversion receiver to accurately estimate amplitude and phase imbalances of received I and Q components using frequency-based estimation techniques, without being adversely affected by channel fading effects or frequency offset between the transmitter and the direct conversion receiver.

These and other needs are attained by the present invention, where an OFDM transceiver has a transmitter, a receiver, and a loopback switch. The loopback switch configured is for selectively establishing a physical connection between an output terminal of the transmitter and an input terminal of the receiver. The transmitter is configured for outputting to the output terminal an OFDM signal generated based on a local oscillator signal. The receiver is configured for demodulating the OFDM signal, received via the physical connection, using the local oscillator signal and determining amplitude and phase imbalance parameters based on performing frequency-domain estimation of amplitude and phase imbalances. Hence, the receiver is configured for performing imbalance compensation on a received wireless OFDM signal based on the determined amplitude and phase imbalance parameters. Hence, amplitude and phase imbalances can be estimated accurately despite channel fading and frequency variations encountered between the transmitter of the wireless OFDM signal and the receiver.

One aspect of the present invention provides a method in an OFDM direct conversion transceiver having a transmitter and a receiver. The method includes selectively establishing a physical connection between an output terminal of the transmitter and an input terminal of the receiver, and outputting from the transmitter an OFDM signal generated based on a local oscillator signal. The method also includes generating a demodulated signal in the receiver by demodulating the OFDM signal, received by the receiver via the physical connection, using the local oscillator signal, determining amplitude and phase imbalance parameters based on performing frequency-domain estimation of amplitude and phase imbalances in the demodulated signal, and performing imbalance compensation on a received wireless OFDM signal based on the determined amplitude and phase imbalance parameters.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment will be described with reference to an overview of an IEEE 802.11 OFDM transceiver, followed by a detailed description of the I/Q compensation module implemented according to an embodiment of the present invention.

Receiver Architecture Overview

Figure 2:
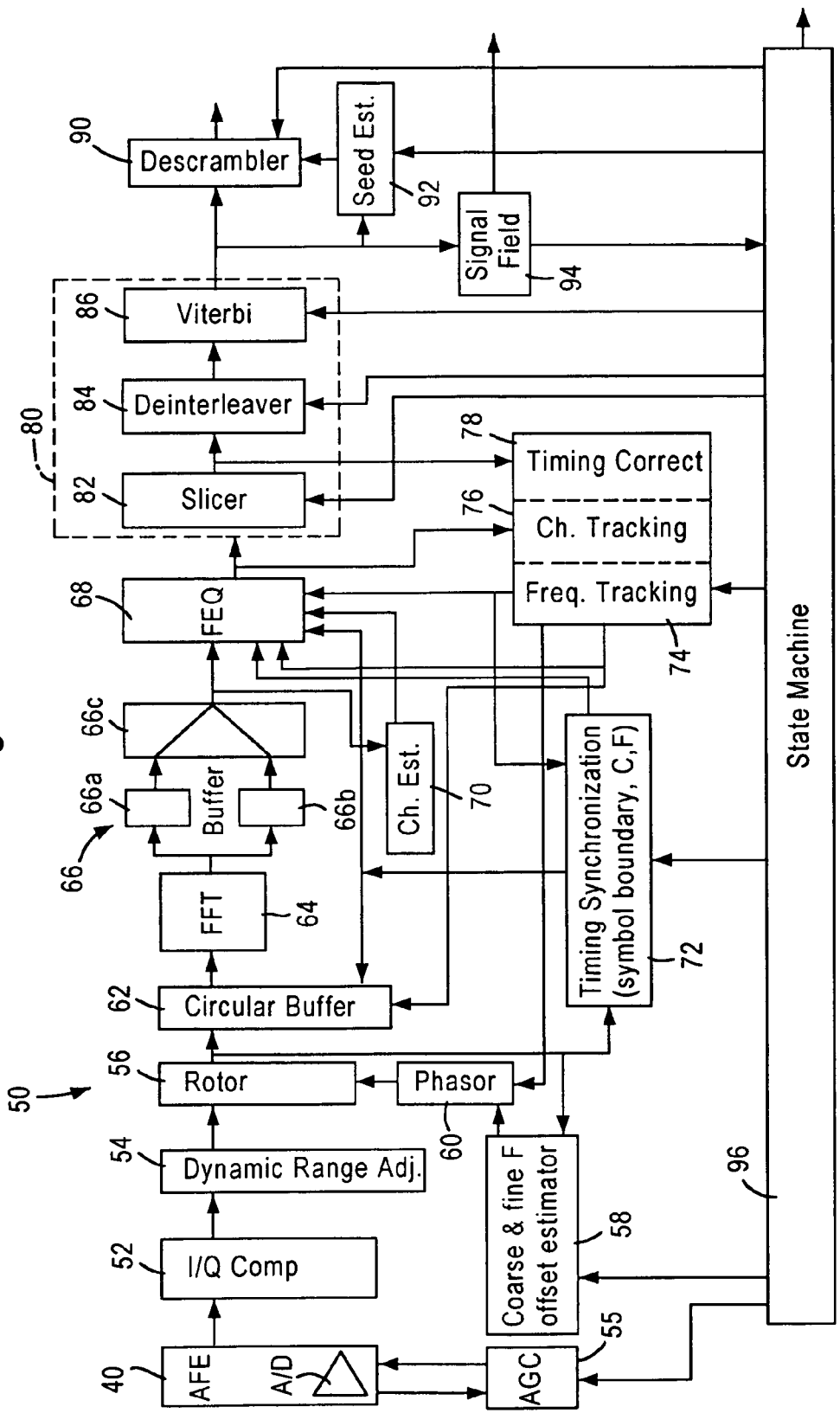
FIG. 2 is a diagram illustrating the receiver portion of an IEEE 802.11 OFDM transceiver according to an embodiment of the present invention.

FIG. 2 is a diagram illustrating an architecture of a receiver module 50 of an IEEE 802.11 Orthogonal Frequency Division Multiplexing (OFDM) transceiver, according to an embodiment of the present invention. The receiver module 50, implemented as a digital circuit, includes an I/Q mismatch compensation module 52 that receives detected wireless signal samples (in digital form) from an R/F analog front end (AFE) amplifier 40 having an analog to digital (A/D) converter. The gain of the AFE amplifier 40 is controlled by an AGC module 55. The detected wireless signal samples include an I component and Q component: these I and Q components, which ideally should be orthogonal to each other and have a uniform relative gain, may in fact have a non-orthogonal phase difference (i.e., other than 90 degrees) and have an unequal gain. Hence, the I/Q mismatch compensation module 52 is configured for compensating the mismatched I/Q components to generate compensated signal samples having matched I/Q components with orthogonal phase difference and a uniform relative gain.

The receiver module 50 also includes a dynamic range adjustment module 54. The dynamic range adjustment module 54 is configured for adjusting the gain of the compensated signal samples to a prescribed dynamic range for optimized signal processing, thereby outputting adjusted signal samples according to the prescribed dynamic range.

The rotor circuit 56 is configured for compensating between a local receiver carrier frequency (i.e., local oscillator) and the remote transmitter carrier frequency (i.e., remote oscillator) used to transmit the wireless signal. In particular, the course/fine frequency offset estimator 58 is configured for estimating the difference in the frequency between the local receiver carrier frequency and the remote receiver carrier frequency, and supplying this difference to a phasor circuit 60; the phasor circuit 60 converts the difference value to a complex phasor value (including angle information) which is supplied to the rotor circuit 56. Hence, the rotor circuit 56 rotates the adjusted signal samples based on the complex phasor value, and outputs rotated signal samples.

The circular buffer 62 is configured for buffering the rotated signal samples. In particular, the beginning of a data packet is not guaranteed to be located at the same position within the sequence of rotated signal samples. Hence, the rotated signal samples are stored in the circular buffer 62 in a manner such that any data sample within a prescribed duration (e.g., one maximum-length data packet) can be located and retrieved from the circular buffer 62. Once the circular buffer 62 reaches capacity, any new signal sample to be stored in the circular buffer 62 is overwritten over the oldest stored signal sample. Hence, the circular buffer 62 enables the receiver 50 to adjust the "starting point" of the data packet within the sequence of rotated signal samples.

The Fast Fourier Transform (FFT) circuit 64 is configured for converting the time-based sequence of rotated signal samples into a frequency domain-based series of prescribed frequency points (i.e., "tones"); according to the disclosed embodiment, the FFT circuit 64 maps the rotated signal samples to a frequency domain of fifty-two (52) available tones.

In particular, the available fifty-two (52) tones are used to transport information: four (4) tones are used as pilot tones, and the remaining forty-eight (48) tones are data tones, where each tone may carry from one to six (1–6) bits of information. According to the IEEE 802.11a/g specification, the physical layer data packet should include a short training sequence, a long training sequence, a signal field (indicating the data rate and length of the payload, and coded at the lowest data rate of 6 Mbps), and the payload data symbols encoded in one of eight data rates from 6 Mbps to 54 Mbps. The FFT circuit 64 determines the data rate from the signal field, and recovers the data tones.

The FFT circuit 64 outputs a group of tone data to a buffer 66, illustrated as a first buffer portion 66a, a second buffer portion 66b, and a switch 66c: the FFT circuit 64 alternately outputs the groups of tone data between the buffer portions 66a and 66b, enabling the switch 66 to output one group of tone data from one buffer portion (e.g., 66a) while the FFT circuit 64 is outputting the next group of tone data into the other buffer portion (e.g., 66b). Note actual implementation may utilize addressing logic to execute the functions of the switch 66c.

Since certain tones output by the FFT 64 may have encountered fading due to signal attenuation and distortion on the wireless channel, equalization is necessary to correct the fading. The frequency domain equalizer 68 is configured for reversing the fading encountered by the tones in order to provide equalized tones. Channel information is obtained by the channel estimator 70 from the long training sequence in the IEEE 802.11 preamble; the channel information is used by the channel estimator 70 to estimate the channel characteristics; the estimated channel characteristics are supplied to the frequency equalizer 68 to enable equalization of each tone.

In addition to the coarse and fine frequency offset estimator 58, the phasor circuit 60 and the channel estimator 70, the receiver module 50 also includes a timing synchronization module 72, a frequency tracking block 74, a channel tracking block 76, and a timing correction block 78 for controlling signal conditioning to ensure the received signal samples are decoded properly to accurately recover the data symbols.

The decoding portion 80 includes a digital slicer module 82, a deinterleaver 84, and a Viterbi decoder 86. The digital slicer module recovers up to 6 bits of symbol data from each tone, based on the data rate specified in the signal field in the preamble. The deinterleaver 84 performs the converse operation of the transmitter interleaver circuit, and rearranges the data back into the proper sequence of deinterleaved data. The Viterbi decoder 86 is configured for decoding the deinterleaved data into decoded data, in accordance with the IEEE 802.11 specification.

The descrambler circuit 90 is configured for recovering the original serial bit stream from the decoded data, by descrambling a 127-bit sequence generated by the scrambler of the transmitter, according to the IEEE 802.11 specification. The descrambler circuit 90 utilizes a scrambling seed, recovered from the service field of the data packet by the seed estimation circuit 92, for the descrambling operation. The signal field information from the preamble also is stored in a signal field buffer 94, configured for storing the length and data rate of the payload in the data packet. Overall control of the components of the receiver 50 is maintained by the state machine 96.

Hence, the serial bit stream recovered by the descrambler circuit 90 is output to an IEEE 802.11 compliant Media Access Controller (MAC).

Frequency Domain Estimation Using Loopback for I/Q Imbalance Estimation

Figure 3:
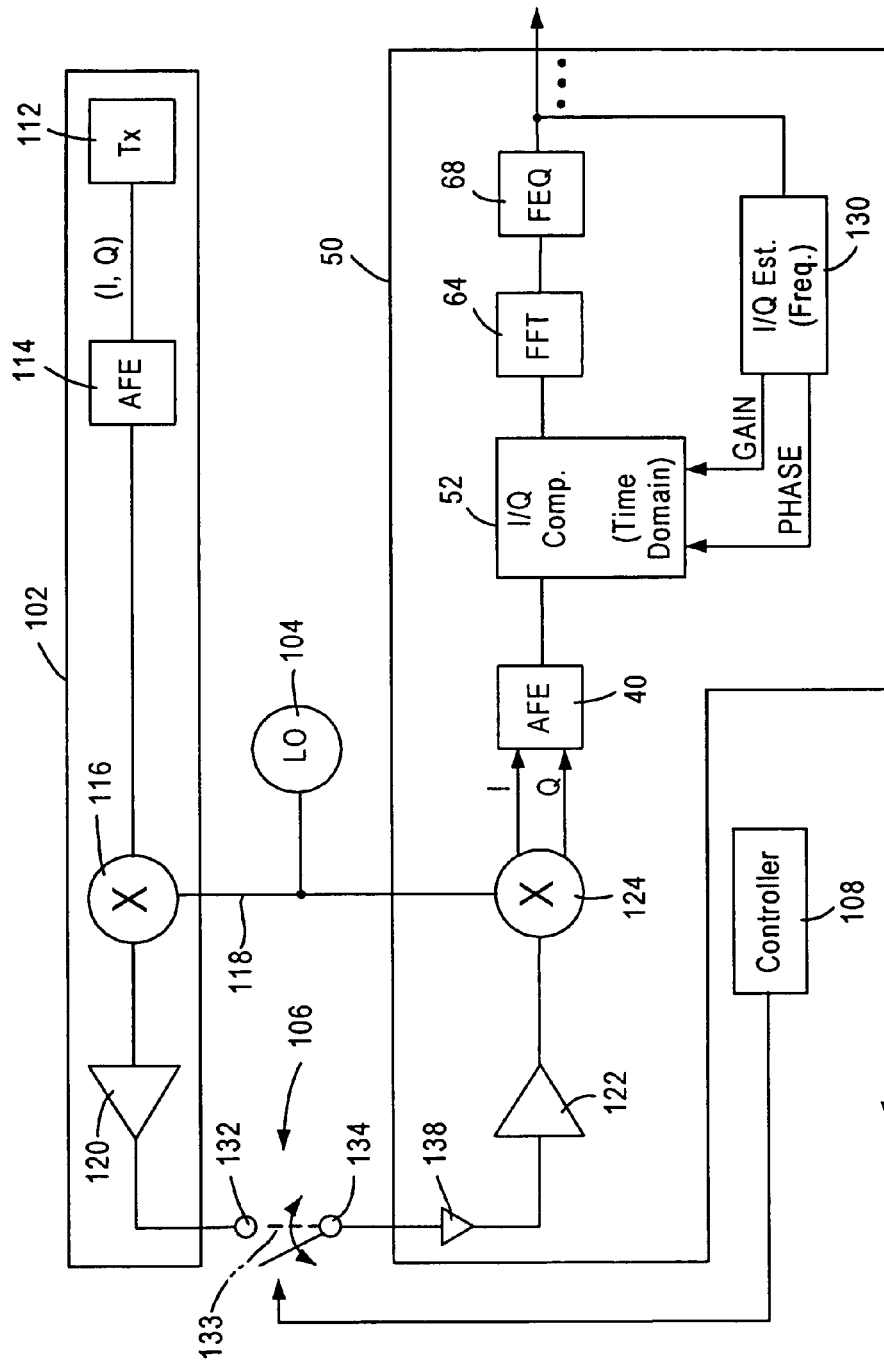
FIG. 3 is a block diagram illustrating the in further detail the OFDM transceiver having the loopback switch for frequency-based determination of amplitude and phase imbalance parameters for I/Q compensation, according to an embodiment of the present invention.
Figure 4:
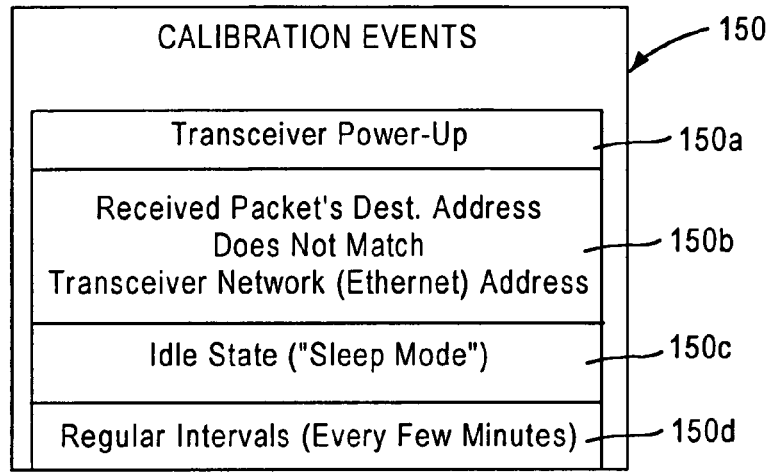
FIG. 4 is a diagram illustrating loopback trigger options used by the controller of FIG. 3 for initiating loopback calibration, according to an embodiment.

FIG. 3 is a diagram illustrating in different detail an OFDM transceiver 100 according to an embodiment of the present invention. As described below, the disclosed embodiment removes the effects of frequency offset and channel characteristics, for estimation purposes, by looping back the transmitted signal into the receiver for purposes of calibrating the IQ imbalance.

The OFDM transceiver 100 includes a transmitter 102, the receiver 50, a local oscillator 104, and a loopback switch 106 controlled by a controller 108. The transmitter 102 includes a transmit portion 112 configured for generating the baseband OFDM signal (having I and Q signal components) according to IEEE 802.11a protocol, an analog front end amplifier 114 configured for amplifying the baseband OFDM signal, a mixer 116 configured for modulating the OFDM signal to prescribed wireless frequencies based on a local oscillator signal 118, and a power amplifier 120 configured for amplifying the modulated OFDM signal for wireless transmission.

Figure 1:
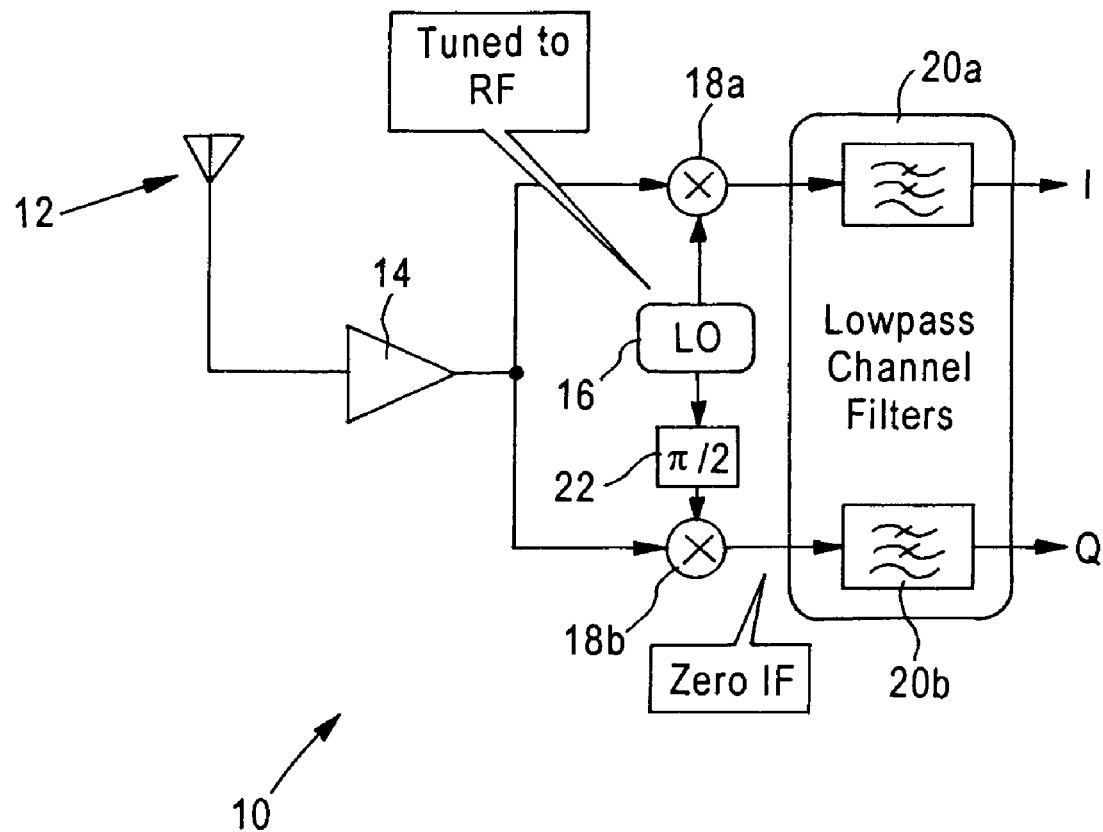
FIG. 1 is a diagram illustrating a conventional (PRIOR ART) direct conversion receiver configured for recovering I and Q components from a received IEEE 802.11 OFDM wireless signal.

The receiver 50 also includes a low noise amplifier 122 configured for amplifying received wireless signals, and a mixer 124 configured for demodulating the received OFDM signal into I and Q components based on the local oscillator signal 118. Although not shown in FIG. 3, the mixers 116 and 124 each represent (and hence include) the phase shifter 22, the mixers 18a and 18b, and the low pass filters 20a and 20b as illustrated in FIG. 1. The demodulated signal that includes the I and Q components is supplied to the analog front end 40, described in FIG. 2, which digitizes the demodulated OFDM signal into a digital signal. The I/Q compensation module 52 is configured for performing I/Q imbalance compensation on the received digitized OFDM signal based on prescribed phase (PHASE) and amplitude (GAIN) imbalance parameters, described below.

As described above, after I/Q compensation the OFDM signal is mapped into the frequency domain using an FFT circuit 64 in order to recover the digital data from the prescribed pilot subcarrier frequencies ("tones"). After the FFT samples are output by the FFT circuit 64, the frequency equalizer 68 is configured for digitally correcting for channel fading encountered on the wireless medium (i.e., common air interface).

Following frequency equalization by the frequency equalizer 68, the equalized signals can be supplied to a frequency-based I/Q imbalance estimator.

OFDM is a multitone modulation comprising of data sub-carriers and pilots. The data modulated on the pilots is fixed while the data modulated on the data sub-carriers is random. To accurately measure the amplitude and phase imbalance it is essential that the channel characteristics do not effect the premise behind the algorithm that the recieved I,Q energies at the antenna are different resulting in inaccurate estimation.

The inventors have realized that the mixers 116 and 124, and the power amplifiers 120 and 122, are the predominant sources of I/Q imbalance and in determining precise imbalance parameters. Hence, the disclosed embodiment includes a loopback switch 106, controlled by the controller 108. The controller 108 selectively closes the loopback switch 106, establishing a physical connection 133 between an output terminal 132 of the transmitter 102 and an input terminal 134 of the receiver 50, enabling calibration of the I/Q estimator 130 during prescribed events. Exemplary calibration events 150 executed by the controller 108 are illustrated in FIG. 5, for example where the controller 108 detects that the receiver 50 is not receiving valid data packets via the wireless medium (e.g., during power-up 150a, upon detecting a packet that specifies a destination address distinct from the prescribed network address of the transceiver 100 (150b), a detected idle state (150c)), or at regular prescribed intervals (150d).

Figure 5:
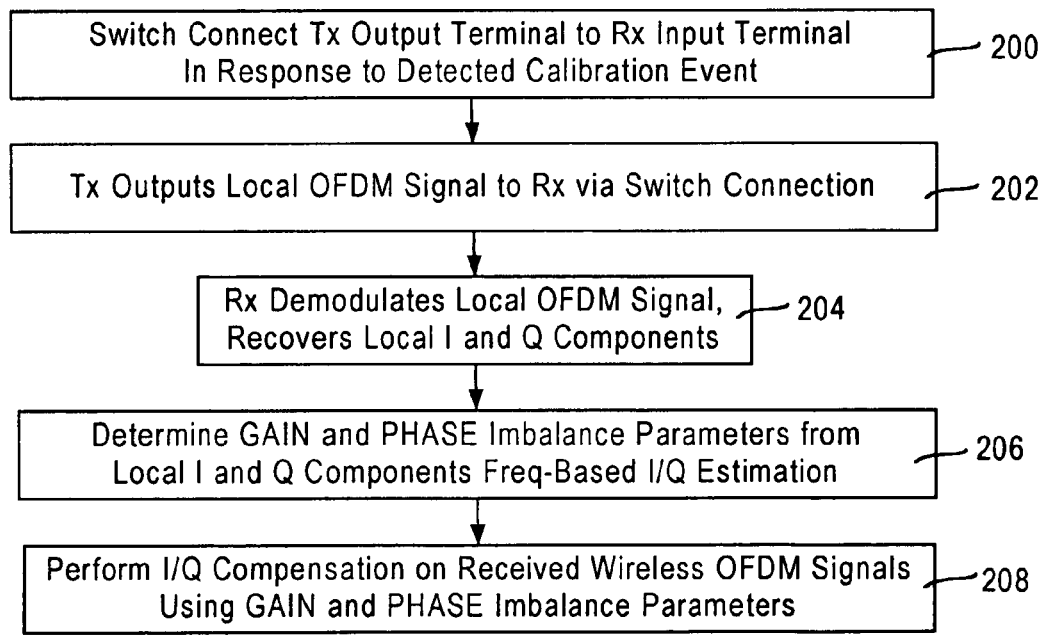
FIG. 5 is a diagram illustrating the loopback calibration operation of the OFDM transceiver of FIG. 3, according to an embodiment of the present invention.

FIG. 5 is a diagram illustrating the loopback calibration of the transceiver 100 according to an embodiment of the present invention. The controller 108 causes the loopback switch 106 to close in step 200, connecting the terminals 132 and 134, in response to a detected calibration event 150. The transmitter 102 outputs in step 202 the local OFDM signal to the receiver 50 via the connection 133 established by the switch 106 and an input buffer 138. The mixer 124 demodulates the local OFDM signal in step 204 and recovers the local I and Q components.

The frequency-based I/Q estimator 130 determines in step 206 the GAIN and PHASE parameters, described below, enabling the compensation module 52 to perform I/Q compensation 208 on received wireless OFDM signals.

Qualitative Analysis: the pilot subcarriers are at frequency positions (7, −7 21, −21) and are modulated by a (1, 1, 1, −1). Assume the following:

$a_k$=Desired symbol at sub-carrier k in a OFDM signal
$\hat{a}_k$=Received symbol at carrier k after imbalance (phase θ, amplitude α)

The received symbol is a combination of the desired symbol and the symbol at the image subcarrier:

$$\hat{a}_k = \left(a_k + \frac{\alpha}{2}a_{-k}\right)\cos\left(\frac{\theta}{2}\right) + j\left(\frac{\alpha}{2}a_k - a_{-k}\right)\sin\left(\frac{\theta}{2}\right)$$

The Channel estimation algorithm executed in the estimator 130 uses the long training symbol to determine the amplitude (α) (GAIN) and phase (θ) (PHASE) parameters to correct the I/Q imbalance. Pilot carriers −21, −7, 7, 21 are modulated by {1 −1, 1, 1} in the long training symbol. For example, the coefficients of the equalizer 52 for sub-carrier 7 are given by the transfer function h(f) of the equalizer 52:

$$h(7) = \frac{1}{\left(1 - \frac{\alpha}{2}\right)\cos\left(\frac{\theta}{2}\right) + j\left(\frac{\alpha}{2} + 1\right)\sin\left(\frac{\theta}{2}\right)}$$

The equalized symbol at subcarrier 7 ($\bar{a}_7$), output by the equalizer 52, is given by:

$$\bar{a}_7 = h(7) * \hat{a}_7$$

where ... $\hat{a}_7 = \left(1 + \frac{\alpha}{2}\right)\cos\left(\frac{\theta}{2}\right) + j\left(\frac{\alpha}{2} - 1\right)\sin\left(\frac{\theta}{2}\right)$ $\Rightarrow \bar{a}_7 \cong (1 + \alpha)\cos(\theta) - j(1 + \alpha)\sin(\theta) ...$ $|\theta| < 0.07\text{rad}, |\alpha| < 0.05(\text{Linear})$ Similarly $\bar{a}_{-7} \cong (1 + \alpha)\cos(\theta) - j(1 + \alpha)\sin(\theta)$ $a_{-21} = -a_{21} \cong (1 - \alpha)\cos(\theta) + j(1 + \alpha)\sin(\theta)$ Hence, the I/Q estimator 130 determines the sin(θ), cos(θ), α from the above set of equations, while the loopback switch 106 supplies the OFDM signal from the transmitter 102 to the receiver 50. Hence, the I/Q estimator supplies the amplitude and gain parameters, determined from the loopback OFDM signal during the calibration interval, to the time domain-based I/Q compensation module 52 for I/Q compensation of received wireless signals during normal operation. The amplitude (α=GAIN) and phase (θ=PHASE) parameters are used by the time domain-based I/Q compensation module 52 until the next loopback calibration interval.

As an example of the above techniques, computer-based simulation of the above-described calibration and I/Q imbalance compensation resulted in the estimator 130 determining an estimated cos(θ)=0.0991326, sin(θ)=0.070187, where α=0.0567. The simulation also considered the following impairments that affected I/Q imbalance: Quantization Noise (A/D, D/A), TX Phase Noise, RX Phase Noise, RX AFE noise, and nonlinearities in the TX 102 and the RX 50.

When the above-described calibration results and amplitude and phase parameters were applied to a simulated compensation by the I/Q compensation module 52, the simulation results were as follows, assuming reception of a wireless OFDM signal having encountered fading from a wireless channel:

| | |
|---|---|
| No IQ mismatch, No compensation | SNR = 27.53 dB |
| With IQ mismatch, No Compensation | SNR = 20.32 dB |
| With IQ mismatch, With Compensation | SNR = 26.5–27.1 dB; | with the assumed impairments being quantization noise in the A/D in the receiver and the D/A in the transmitter, TX phase noise, RX phase noise, RX AFE noise, and nonlinearities in the TX 102 and the RX 50. The assumed frequency offset was 40 ppm between the wireless transmitter and the receiver 50.

In contrast, the simulation results were as follows assuming a flat channel (i.e., no channel fading):

| | |
|---|---|
| No IQ mismatch, No compensation | SNR = 32.5 dB |
| With IQ mismatch, No Compensation | SNR = 25.32 dB |
| With IQ mismatch, With Compensation | SNR = 32.3 dB. |

According to the disclosed embodiment, estimation by the frequency-based estimator 130 is more precise due to elimination of frequency offset and channel effects, resulting in improved signal to noise ratio.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an OFDM direct conversion transceiver having a transmitter and a receiver, the method including:

selectively establishing a physical connection between an output terminal of the transmitter and an input terminal of the receiver;

outputting from the transmitter an OFDM signal generated based on a local oscillator signal;

generating a demodulated signal in the receiver by demodulating the OFDM signal, received by the receiver via the physical connection, using the local oscillator signal;

determining amplitude and phase imbalance parameters based on performing frequency-domain estimation of amplitude and phase imbalances in the demodulated signal; and performing imbalance compensation on a received wireless OFDM signal based on the determined amplitude and phase imbalance parameters.

2. The method of claim 1, wherein the generating step includes outputting I and Q components of the demodulated signal, the determining step includes determining the amplitude and phase imbalances of the I and Q components.

3. The method of claim 2, wherein the performing step includes performing time domain-based I/Q compensation based on the determined amplitude and phase imbalance parameters.

4. The method of claim 1, wherein the selectively establishing step includes connecting the output terminal and the input terminal for a prescribed interval based on one of:
 a power-up sequence for the OFDM direct conversion receiver;
 detecting a wireless OFDM signal carrying a packet specifies a destination address distinct from a prescribed address of the OFDM direct conversion transceiver;
 expiration of a prescribed time interval; and
 a detected idle state in the receiver.

5. The method of claim 1, wherein the outputting step includes sending the OFDM signal to the output terminal following amplification and mixing thereof using the local oscillator signal.

6. An OFDM direct conversion transceiver including:
 a transmitter configured for generating a first OFDM signal based on a local oscillator signal;
 a receiver having a mixer for demodulating a received OFDM signal to a demodulated OFDM signal based on the local oscillator signal, and a compensation module configured for performing imbalance compensation on the demodulated OFDM signal based on determined amplitude and phase imbalance parameters; and
 a loopback switch configured for selectively supplying the first OFDM signal as the received OFDM signal to the receiver via a physical connection;
 the receiver further including an imbalance estimator configured for frequency-based determination of the amplitude and phase imbalance parameters based on the first OFDM signal following demodulation thereof by the mixer.

7. The transceiver of claim 6, wherein the mixer is configured for outputting I and Q components of the demodulated OFDM signal, the imbalance estimator configured for determining the amplitude and phase imbalance based on the I and Q components of the first OFDM signal following demodulation thereof.

8. The receiver of claim 7, wherein the compensation module is configured for performing time domain-based I/Q compensation based on the determined amplitude and phase imbalance parameters.

9. The receiver of claim 6, further comprising switch logic configured for establishing the physical connection for a prescribed interval based on one of:
 a power-up sequence for the OFDM direct conversion receiver;
 detecting a wireless OFDM signal carrying a packet specifies a destination address distinct from a prescribed address of the OFDM direct conversion transceiver;
 expiration of a prescribed time interval; and
 a detected idle state in the receiver.

* * * * *